United States Patent [19]

Kramer

[11] Patent Number: 4,592,688
[45] Date of Patent: Jun. 3, 1986

[54] INSULATION HANGER AND METHOD

[75] Inventor: James W. Kramer, New Lebanon, Ohio

[73] Assignee: Erico Products, Inc., Cleveland, Ohio

[21] Appl. No.: 522,555

[22] Filed: Aug. 12, 1983

[51] Int. Cl.$^4$ ............................................. F16B 21/02
[52] U.S. Cl. ..................................... 411/349; 24/590; 52/410; 52/506
[58] Field of Search .................. 411/349, 500, 552; 52/410, 506; 24/590, 593, 594, 597, 287

[56] References Cited

U.S. PATENT DOCUMENTS

| | | | |
|---|---|---|---|
| 2,120,530 | 6/1938 | Shippee et al. | 411/500 X |
| 2,172,827 | 9/1939 | Becker. | |
| 2,412,744 | 12/1946 | Nelson | 52/410 X |
| 2,697,857 | 12/1954 | Eckel | 411/500 X |
| 3,738,217 | 6/1973 | Walker | 52/506 X |
| 4,293,263 | 10/1981 | Zankl | 411/500 |
| 4,393,635 | 7/1983 | Long | 52/410 X |

FOREIGN PATENT DOCUMENTS

| | | | |
|---|---|---|---|
| 2465040 | 4/1981 | France | 52/410 |
| 629937 | 9/1949 | United Kingdom | 411/500 |
| 829128 | 2/1960 | United Kingdom | 411/349 |
| 637559 | 12/1978 | U.S.S.R. | 411/349 |

OTHER PUBLICATIONS

Ultra-Lock Refractory Anchor, brochure, 1 page from H A Jones Co., Inc.

Primary Examiner—Thomas J. Holko
Attorney, Agent, or Firm—Renner, Otto, Boissele & Lyon

[57] ABSTRACT

A hanger assembly for securing insulation or refractory linings to walls includes a circular stud which includes a flattened locking section of relatively short axial extent forming laterally projecting lugs, a somewhat less flattened anti-rotation section of substantial axial extent inwardly adjacent the locking section, and an unflattened or rotation section of short axial extent inwardly adjacent the anti-rotation section, whereby a quarter-turn retaining washer may be positioned over the stud to the rotation section, rotated a quarter turn and then moved outwardly along the anti-rotation section to engage and lock against the underside of the locking section. The locking and anti-rotation sections may be repeated throughout the length of the stud by a selective flattening of round metal stock so that insulation layers of various thickness may be held to the wall without the possibility of vibration permitting the retaining washer to vibrate free of the locking section, rotate, and become disengaged from the stud.

16 Claims, 10 Drawing Figures

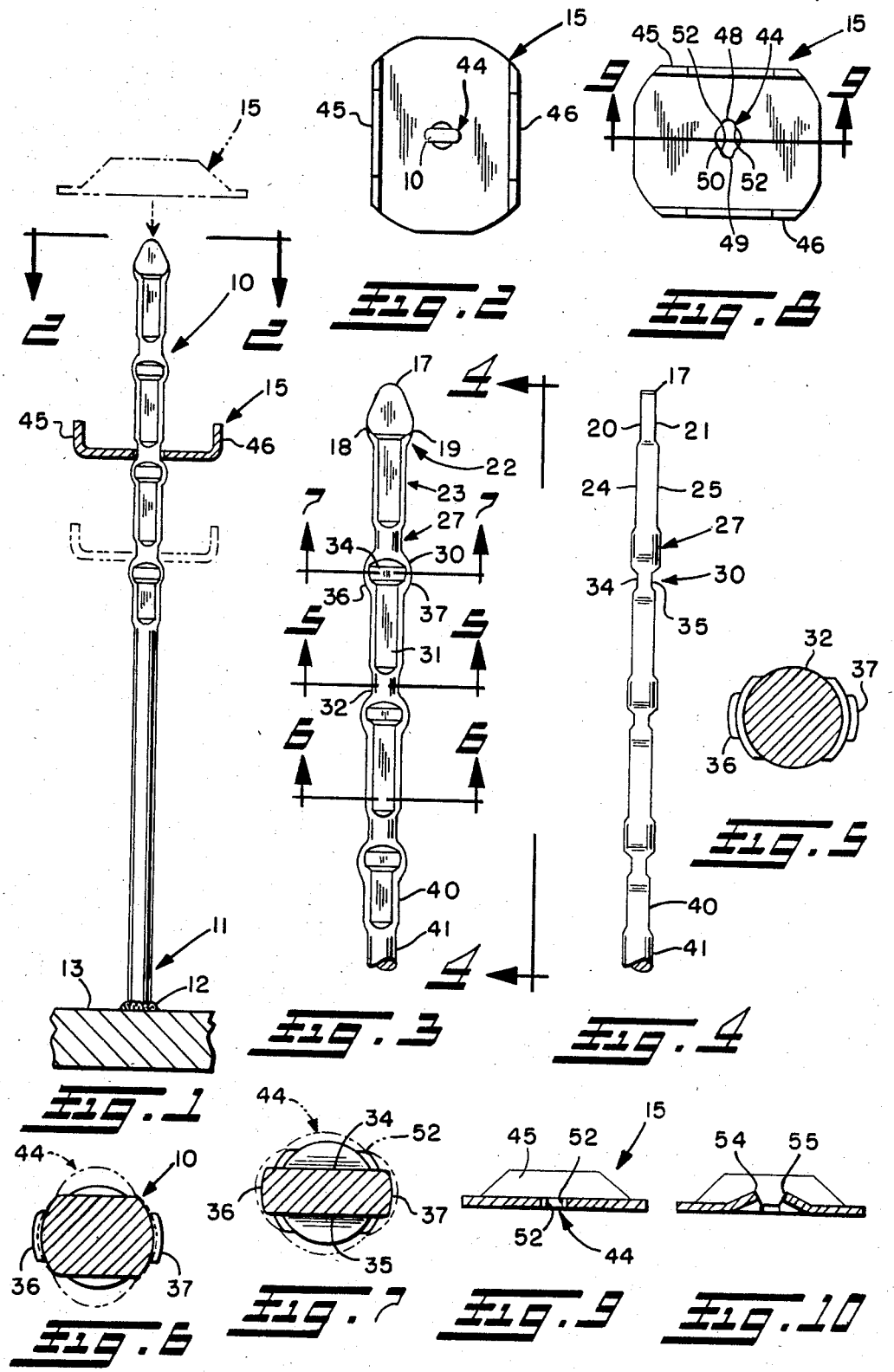

INSULATION HANGER AND METHOD

This invention relates generally as indicated to an insulation hanger and method and more particularly to an insulation hanger which comprises a stud and quarter-turn washer assembly used to secure refractory or insulation materials to walls for heat insulation purposes.

BACKGROUND OF THE INVENTION

Such insulation hangers are widely used in furnaces or other similar installations and usually comprise a stud weldable metal stud or ceramic stud and an associated quarter-turn washer. The stud may be made of relatively high temperature resistant material such as stainless steel or other sophisticated alloys and is normally stud welded to the furnace or other type wall. Batt type insulation material is then impaled upon the stud and held in place by a quarter-turn washer to secure the insulation materials to the wall of the furnace or other structure. Examples of prior art insulation hangers utilizing such studs and quarter-turn washers may be seen, for example, in Nelson U.S. Pat. No. 2,412,744, Rutter et al U.S. Pat. No. 3,523,395, Walker U.S. Pat. No. 3,738,217 and McLean U.S. Pat. No. D-265,288. The latter patent is a design patent on the configuration of the stud used in the widely employed ULTRA-LOK insulation hanger manufactured and sold by the Erico Jones Company of Dayton, Ohio.

As noted, the insulation hangers of the above prior art employ a bayonet-type or quarter-turn washer which is inserted over the stud and then rotated 90° to lock behind a formed projection or cut notch on the stud to contain the insulation material between the washer and the wall to which the stud is secured. Similar studs may be secured by adhesive as shown, for example, in Eckel U.S. Pat. No. 2,697,857.

In prior devices such as shown in the Walker, Rutter et al and the ULTRA-LOK design, insulation applications in situations where vibration may occur such as through the employment of blowers, burners, or conveyors, or normal shipboard vibrations, may tend to cause the quarter-turn washer to rotate from its locking position. This problem is particularly aggravated if the insulation materials tend to shrink throughout their service life. The problem is also aggravated if the stud extends in a slightly downwardly direction or vertically as when the insulation hanger is employed to secure insulation materials to the underside of a wall or ceiling of a furnace. In some few instances, the quarter-turn washer has been known to become loose and in some further instances, has been known to fall off of the stud thus in effect releasing the insulating material.

When forming insulation hangers, it is preferred to utilize round stock. Such round stock initially does not require a subsequent flattening or slitting operation to form flattened stock, and moreover if notches are to be cut therefrom as in the above mentioned Walker patent, the cross-sectional area of the stud is not reduced nor are scrap losses generated, nor are notch sensitive or stress riser areas formed on the elongated stud. This is important in the manufacturing operation from metal stock since notching requires expensive dies which must be continually replaced and/or sharpened. Moreover, the material from which the stock is made has to be temperature sensitive and the alloys involved such as stainless steel or INCONEL are quite expensive. Moreover, the service life of any insulation hanger, if formed of metal, is directly proportional to its cross-sectional area at the hot face. Obviously, notching or stock removal reduces that cross-sectional area and thus reduces the service life of the hanger. Further, in stud welding round stock as opposed to flattened stock, considerably less energy is required to form a sound weld between the stud and the wall to which it is affixed. In this manner a stud formed from round stock provides a more efficient insulation hanger and also provides an insulation hanger with a longer service life if the cross-sectional area thereof is not diminished significantly in its formation. It has, for example, been calculated that a flattened stud such as utilized in the aforenoted ULTRA-LOK hanger assembly has approximately 75% more cross-sectional area at the hot face than does a flatttened and notched stud as shown in the aforenoted Walker Pat. No. 3,738,217.

However, as noted in connection with all of the prior art studs, vibration in a furnace or other insulating environment may tend to cause the washer to rotate from its locking position.

SUMMARY OF THE INVENTION

With the present invention there is provided an insulation hanger which alleviates the above noted problems. Initially, it should be noted that the hanger stud is manufactured from round stock which is selectively flattened to form a locking section of relatively short axial extent, such section forming laterally projecting lugs. A somewhat less flattened anti-rotation section of substantial axial extent is provided inwardly adjacent the locking section, and inwardly of that there is provided an unflattened or rotation section of short axial extent. In this manner a quarter-turn retaining washer may be positioned over the stud to the rotation section, and then rotated a quarter turn and then moved outwardly along the anti-rotation section to engage and lock against the underside of the locking section.

This all may be accomplished by selectively flattening to a greater of lesser degree round stock in flattening dies thus avoiding notching dies which create notches or which remove expensive stock, all of which significantly reduces the cross-sectional area of the stud exposed at the hot face.

The locking and anti-rotation sections may be repeated throughout the length of the stud by a selective flattening of the round metal stock so that insulation layers of various thickness may be held to the wall without the possibility of vibration permitting the retaining washer to vibrate free of the locking section, rotate, and become disengaged from the stud.

It is therefore a principal object of the present invention to provide an insulation hanger assembly which is formed of round stock but which includes a locking section and an associated anti-rotation section precluding the disengagement of the washer from the stud in the event of vibration and/or shrinking of the insulation materials.

Another principal object is the provision of an insulation hanger assembly which does not require the formation of rectangular or flattened stock and the cutting of notches therefrom thus forming both expensive scrap losses and notch sensitivity or stress riser areas in the resulting stud while at the same time reducing the cross-sectional area thereof and the service life.

A further important object is the provision of an insulation hanger assembly which can very easily be manufactured at low cost.

Another principal object is the provision of such insulation hanger which does not require expensive and often replaced or sharpened notching or cutting dies.

Yet another object is the provision of an insulation hanger assembly which includes a relatively long anti-rotation section or keying section for the associated quarter-turn washer which precludes the rotation of the washer even though it may become disengaged with the locking section.

Still another object is the provision of an insulation hanger assembly and a low cost method of making that hanger assembly which will provide longer and more reliable service life.

Other objects and advantages of the present invention will become apparent as the following description proceeds.

To the accomplishment of the foregoing and related ends the invention, then, comprises the features hereinafter fully described and particularly pointed out in the claims, the following description and the annexed drawing setting forth in detail certain illustrative embodiments of the invention, these being indicative, however, of but a few of the various ways in which the principles of the invention may be employed.

BRIEF DESCRIPTION OF THE DRAWING

In said annexed drawing:

FIG. 1 is an elevation of a hanger in accordance with the present invention showing the stud secured to a wall and the associated quarter-turn washer at a rotation section;

FIG. 2 is a top plan view of the washer and stud as seen from the line 2—2 of FIG. 1;

FIG. 3 is a somewhat enlarged elevation of the stud broken away;

FIG. 4 is a side elevation of the stud as seen from the line 4—4 of FIG. 3;

FIG. 5 is an enlarged transverse section of the stud as taken through the rotation section on the line 5—5 thereof;

FIG. 6 is a view similar to FIG. 5 as taken through the anti-rotation section from the line 6—6 of FIG. 3;

FIG. 7 is a similar transverse section through the stud as seen from the line 7—7 of FIG. 3;

FIG. 8 is a plan view of the quarter-turn washer without the stud present;

FIG. 9 is a transverse section of the washer as seen from the line 9—9 of FIG. 8; and FIG. 10 is a similar section of a preferred form of washer in accordance with the invention, with the locking edges of the hole upset to form a wedging engagement.

DETAILED DESCRIPTION OF THE DRAWINGS

Referring first to FIG. 1 there is illustrated a stud 10 in accordance with the invention which includes an inner or proximal end 11 which may be stud welded as indicated at 12 to a furnace wall, ceiling, or the like.

The stud 10 may be manufactured from round stock which is selectively flattened to provide locking sections, anti-rotation or keying sections, and rotation sections for a retaining washer or clip seen at 15. The locking sections are most severely flattened and extend for a relatively short axial distance. The anti-rotation or keying sections are less severely flattened and extend for a significant axial distance while the rotation sections are unflattened, being the original round stock.

Referring now additionally to FIGS. 3 and 4 it will be seen that the distal end or tip 17 of the stud is cropped and flattened to form a spear or pointed tip to assist in impaling insulation thereover, and in doing so there are created lateral bulges or lugs indicated at 18 and 19. The flattened surfaces are seen at 20 and 21. The bulges 18 and 19 form the initial or outermost locking section 22, which is quite close to the tip of the stud.

Inwardly adjacent the locking section 22 is a keying or anti-rotation section 23 which is formed by opposed flats 24 and 25. The section 23 extends from the locking section 22 to a rotation section 27 which is simply the unflattened original round stock. Both the locking section 22 and the rotation section 27 are of relatively short axial extent while the anti-rotation section 23 is significantly longer.

The sections may be repeated inwardly along the stud to provide a locking section seen at 30, anti-rotation section seen at 31 and a rotation section seen at 32. A indicated in FIG. 3 the more severe flattening at the locking section 30 indicated at 34 and 35 produces lateral bulges or lugs 36 and 37. Two additional locking sections are also provided along the stud inwardly as are two additional anti-rotation or keying sections. It is noted that the innermost anti-rotation or keying section seen at 40 may be somewhat foreshortened and the shank of the stud indicated at 41 inwardly thereadjacent is the corresponding rotation section.

Referring now to FIGS. 2, 8, 6 and 7, it will be seen that the retaining clip or washer has a hole in the center thereof as indicated at 44. In one embodiment the washer may be plain sheet metal, relatively thin and has two upturned ears 45 and 46 enabling it to be grasped between the thumb and forefinger for placement over the stud and for the required quarter turn rotation.

The configuration of the hole which is also shown in phantom lines in FIGS. 6 and 7 is somewhat complex and comprises generally an overlaid circle and ellipse. As seen in FIG. 8 the axis of the ellipse extends vertically providing diametrically opposed extensions 48 and 49 extending from the outline of the circular portion 50 of the aperture. The intersection of the circle and the ellipse provides for four interior cusps on the aperture indicated at 52. The projections 48 and 49 permit the bulges 36 and 37 to pass through the aperture as the washer is inserted on the stud. The washer may then be rotated at the rotation section 90° and then moved back along the anti-rotation section. However, the edges of the flats of the anti-rotation section interfere with the cusps 52 so that the washer cannot rotate throughout the anti-rotation or keying section.

As noted from the drawing, the axial extent of the anti-rotation sections may be about three times the axial extent of the locking section while the flats forming the respective sections may be of a ratio on the order of about five or more to one.

In this manner, should the insulation shrink or should the hanger assembly to subject to vibration, and dislodge from the locking section, it cannot rotate or fall off as long as it is still engaged with the anti-rotation or keying section.

With reference to FIG. 10, it will be seen that the washer may be upset on the shorter transverse dimension of the aperature as indicated at 54 and 55 so that the edge of the aperture is formed by a wall extending upwardly more directly to engage the corresponding surface or section of the bulges 36 and 37. With such upset edge, and the resulting wedging engagement, the washer and stud assembly has increased tensile capabilities.

It will also be appreciated that with the stud of the present invention conical ceramic studs may be employed for extremely high temperature applications such as shown in Hickels U.S. Pat. No. 4,157,001. The wall of the conical refractory anchor would have the same hole configuration as seen in FIG. 8.

It should also be noted that with the initial locking section close to the outer tip of the stud, the end user need not employ a stud any longer than required. Heretofore it has been standard to have the initial locking section about one-half inch from the tip of the stud. With the present invention, when applying, for example, four inches of fiber it is only necessary to use a four inch stud. Further, with round stock, accessory costs, such as ferules, etc., are about half that required for rectangular stock.

It can now be seen that there is provided an insulation hanger which utilizes round stock selectively flattened to provide locking sections and relatively extensive anti-rotation sections subjacent thereto. In this manner if the inulation hanger is subjected to vibration or other dynamic forces, particularly in the event the insulation might shrink, it will not back off sufficiently from its locking position and be free to rotate and thus become dislodged.

It will also be appreciated that instead of being formed from high temperature alloy material, for example, both the stud and washer, the latter whether conical or flat, may be formed of ceramic material.

Although the invention has been shown and described with respect to preferred embodiments, it is obvious that equivalent alterations and modifications will occur to others skilled in the art upon the reading and understanding of this specification. The present invention includes all such equivalent alterations and modifications, and is limited only by the scope of the claims.

I claim:

1. An insulation hanger assembly for securing blanket insulation to a wall, comprising a generally circular in section stud securable at its inner end to a wall, and a washer positionable on said stud; said stud including a locking section distorted to create bulges forming laterally projecting lugs of relatively short axial length, an anti-rotation section inwardly adjacent said locking section and distorted to create lateral bulges of substantially greater axial length but to a lesser lateral degree than the lug forming bulges of the locking section, and a rotation section which is free of locking or anti-rotation bulges and is of relatively short axial length inwardly adjacent said anti-rotation section; and said washer including an aperture means that allows the washer in a first rotational position to pass axially over said lugs but not in a second rotational position, to rotate at the rotational section of the stud between such first and second rotational positions, and to pass axially along the anti-rotation section of the stud from said rotation section to said locking section while rotationally interfering with the bulges of said anti-rotation section to prevent rotation of said washer to such first rotational position, whereby said washer may be positioned over the stud to the rotation section, rotated, and then moved outwardly along the anti-rotation section to engage and lock against the projecting lugs.

2. A hanger assembly as set forth in claim 1, wherein said anti-rotation section is of a uniform cross-sectional shape throughout its axial length.

3. A hanger assembly as set forth in claim 1, wherein said anti-rotation section has diametrically opposed, parallel flat surfaces extending the axial length thereof.

4. A hanger assembly as set forth in claim 3, wherein said lateral bulges of said anti-rotation section have curved outer surfaces intersecting said flat surfaces along respective axially extending parallel lines.

5. A hanger assembly as set forth in claim 4, wherein said aperture means has a pair of diametrically opposed symmetrical arcuate portions respectively corresponding generally to a circle and an ellipse, and said arcuate portions intersect to produce symmetrical cusps which create a rotational interference with said lateral bulges of said anti-rotation section along the axial length thereof.

6. A hanger assembly as set forth in claim 1, wherein said locking section, anti-rotation section and rotation section are of substantially uniform cross-sectional area throughout their collective axial lengths.

7. A hanger assembly as set forth in claim 1, wherein said aperture means includes symmetrical portions generally corresponding to a circle and an ellipse.

8. A hanger assembly as set forth in claim 7, wherein the intersections of such portions produce symmetrical cusps which create a rotational interference with the anti-rotation section of the stud when the washer is positioned therealong.

9. A hanger assembly as set forth in claim 8, wherein the portions of the aperture means generally corresponding to a circle create an axial interference with the projecting lugs of the locking section when the washer is properly rotated.

10. A hanger assembly as set forth in claim 9, wherein the washer is upset in the area of the circular portions of the aperture means to engage the projecting lugs of the locking section at an acute angle to the axis of the stud.

11. A hanger assembly as set forth in claim 1, wherein the locking section is formed by opposed flats distorting round stock to create diametrically extending bulges forming said laterally projecting lugs.

12. A hanger assembly as set forth in claim 11, wherein the anti-rotation section is formed by opposed flats distorting round stock to create lateral bulges but to a lesser extent than the lug forming bulges of the locking section.

13. A hanger assembly as set forth in claim 12, wherein the flats forming the anti-rotation section are at least three times the axial length of the locking section.

14. A hanger assembly as set forth in claim 12, wherein the flats forming the anti-rotation section are at least five times the axial length of the flats forming the locking section.

15. A hanger assembly as set forth in claim 12, wherein the rotation section is a short unflattened section of the circular stud.

16. An insulation hanger assembly for securing blanket insulation to a wall, comprising a generally circular in section stud securable at its inner end to a wall and a washer positionable on said stud; said stud including a locking portion of relatively short axial length which includes laterally projecting lugs, an anti-rotation section of substantially greater axial length inwardly adjacent the locking section and of uniform cross-sectional shape throughout its axial length said anti-rotation section including lugs which project laterally to a lesser degree than the laterally projecting lugs of the locking portion, and a rotation section of relatively short axial length being free of locking or anti-rotation lugs; and said washer including an aperture means that allows the washer in a first rotational position to pass axially over said lugs of said locking portion but not in a second rotational position, to rotate at the rotational section of the stud between such first and second rotational positions, and to pass axially along the lugs of the anti-rotation section from said rotation section to said locking section while rotationally interfering with the lugs of said anti-rotation section to prevent rotation of said washer to said first rotational position.

* * * * *